United States Patent
Ghannam et al.

(10) Patent No.: US 9,493,133 B2
(45) Date of Patent: Nov. 15, 2016

(54) FASTENING AND SENSING APPARATUS

(71) Applicant: Ford Global Technologies, LLC, Dearborn, MI (US)

(72) Inventors: Mahmoud Yousef Ghannam, Canton, MI (US); Abraham G. Philip, Rochester Hills, MI (US); Erich Kemnitz, Northville, MI (US)

(73) Assignee: FORD GLOBAL TECHNOLOGIES, LLC, Dearborn, MI (US)

( * ) Notice: Subject to any disclaimer, the term of this patent is extended or adjusted under 35 U.S.C. 154(b) by 240 days.

(21) Appl. No.: 14/282,320

(22) Filed: May 20, 2014

(65) Prior Publication Data

US 2015/0336527 A1    Nov. 26, 2015

(51) Int. Cl.
| | |
|---|---|
| *G01L 9/08* | (2006.01) |
| *B60R 21/0136* | (2006.01) |
| *G01L 19/00* | (2006.01) |
| *B60R 11/00* | (2006.01) |
| *G01L 23/10* | (2006.01) |
| *F16B 1/00* | (2006.01) |
| *B60R 21/01* | (2006.01) |
| *F16B 35/04* | (2006.01) |

(52) U.S. Cl.
CPC .......... *B60R 21/0136* (2013.01); *B60R 11/00* (2013.01); *F16B 1/0071* (2013.01); *G01L 9/08* (2013.01); *G01L 19/00* (2013.01); *G01L 19/0038* (2013.01); *G01L 19/0069* (2013.01); *G01L 23/10* (2013.01); *B60R 2021/0104* (2013.01); *F16B 35/041* (2013.01)

(58) Field of Classification Search
None
See application file for complete search history.

(56) References Cited

U.S. PATENT DOCUMENTS

| | | | | |
|---|---|---|---|---|
| 6,038,927 A | * | 3/2000 | Karas | ..................... G01L 13/026 73/706 |
| 6,145,383 A | | 11/2000 | Meringdal et al. | |
| 6,845,656 B2 | | 1/2005 | Matsumura et al. | |
| 7,753,419 B2 | | 7/2010 | Kondo | |
| 7,994,901 B2 | | 8/2011 | Malis et al. | |
| 2003/0041679 A1 | * | 3/2003 | Allen | ...................... G01F 1/662 73/866.5 |
| 2011/0101997 A1 | * | 5/2011 | Gulbranson | ............. G01N 9/36 324/664 |
| 2015/0148693 A1 | * | 5/2015 | Burkett | ................ A61B 5/0215 600/486 |
| 2015/0354431 A1 | * | 12/2015 | Denis | ................. G01N 33/0037 73/866.5 |

FOREIGN PATENT DOCUMENTS

KR    20020081198    10/2002

* cited by examiner

*Primary Examiner* — Andre Allen
(74) *Attorney, Agent, or Firm* — Frank A. MacKenzie; Bejin Bieneman PLC

(57) ABSTRACT

An apparatus includes a body having a fastening portion and a pressure sensor coupled to the body apart from the fastening portion. The pressure sensor has a chamber therein. The body includes a first channel extending therethrough from an outside surface thereof. The first channel is in fluid communication with the chamber.

20 Claims, 6 Drawing Sheets

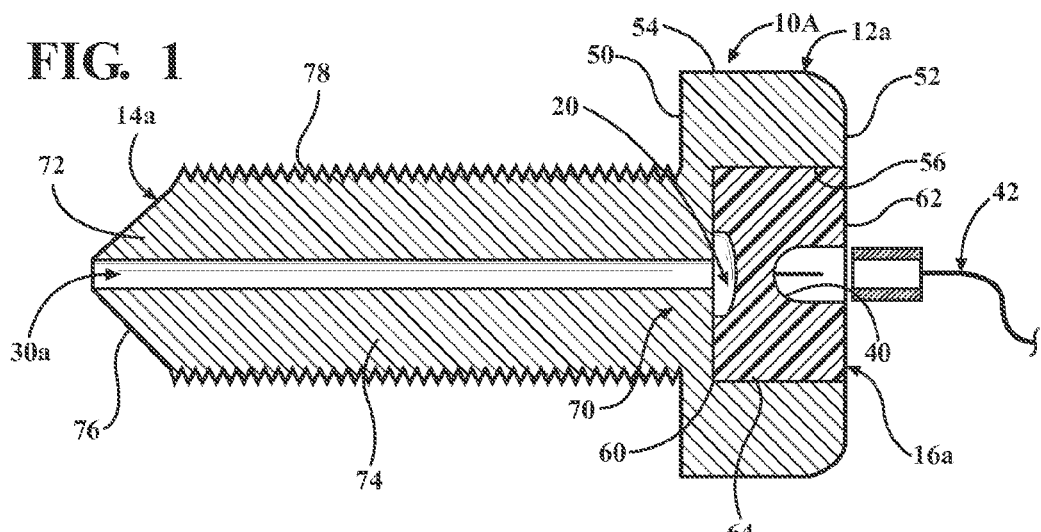
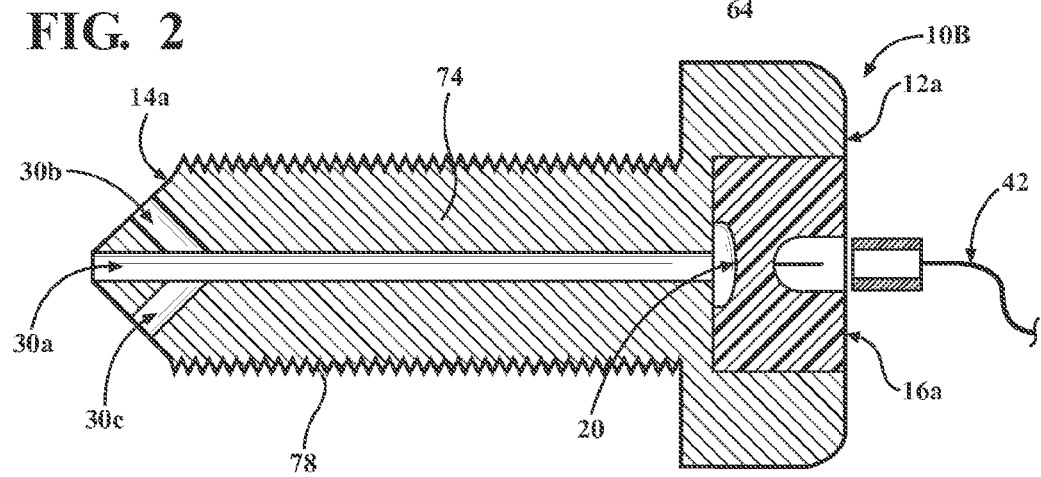
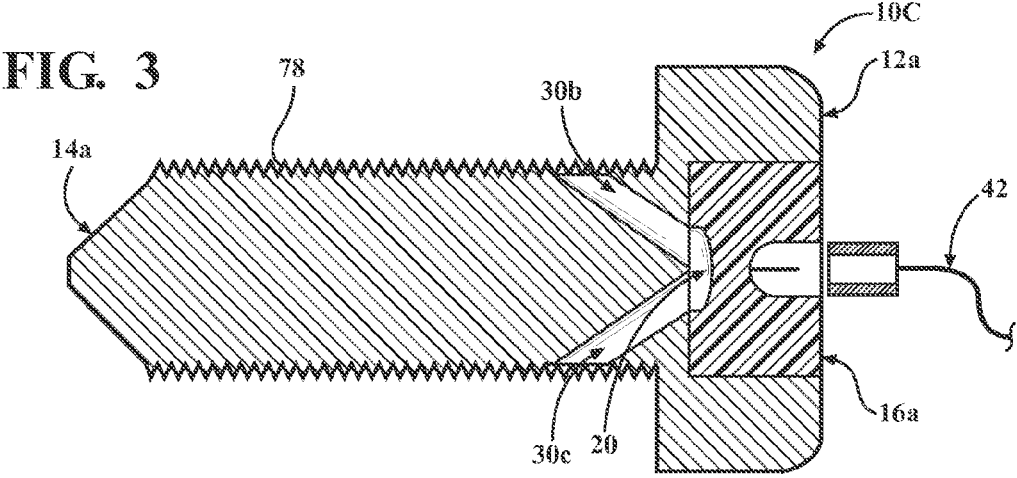

FASTENING AND SENSING APPARATUS

BACKGROUND

Vehicles, such as automobiles, may incorporate a variety of sensors in their operation and control. For example, vehicles may include pressure sensors coupled to the outer portions thereof, such as bumpers and doors, toward sensing and identifying impacts with the vehicle and deploying and controlling safety equipment. In one exemplary instance, for collisions with pedestrians, vehicles may include equipment such as bumper- or hood-mounted airbags and hood-lifting systems. To control and employ such equipment, the vehicle is required to detect and identify a corresponding collision through a sensor such as pressure sensor. Current pressure sensor mechanisms and systems for such vehicle applications can be difficult to utilize due to their size, configuration and needs for protection, as component packaging and manufacturing assembly requirements differ from vehicle to vehicle.

DRAWINGS

FIG. 1 is a cross-sectional view of an exemplary sensing fastener.

FIG. 2 is a cross-sectional view of another exemplary sensing fastener.

FIG. 3 is a cross-sectional view of another exemplary sensing fastener.

DETAILED DESCRIPTION

Figure 4:
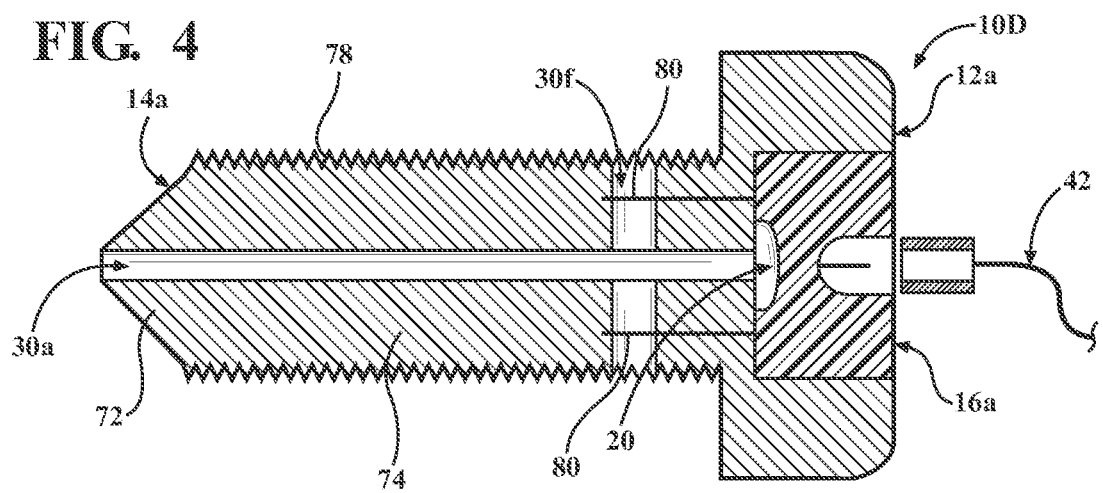
FIG. 4 is a cross-sectional view of another exemplary sensing fastener.

FIG. 1 is an exemplary cross-sectional illustration of an exemplary sensing fastener 10A. The fastener 10A includes a head portion 12a, a relatively elongate body portion 14a, and a sensing element or sensor 16a. The sensing element 16a includes a chamber 20 formed therein, and the body 14a includes a main channel 30a extending therethrough. Channel 30a is in fluid communication with the chamber 20 and the volume outside of the body 14a.

The fastener 10A may be configured for use in a vehicle 100 (FIG. 12), such as an automobile. The sensing element 16a of the fastener 10A may include, for example, a piezoelectric material and electronic components for detecting and transmitting a signal from that material, such as a port 40 for receiving a connector 42. The connecter 42 is configured to couple to and communicate with vehicle 100, e.g., with a computer 105 (FIG. 12) of the vehicle 100.

Figure 12:
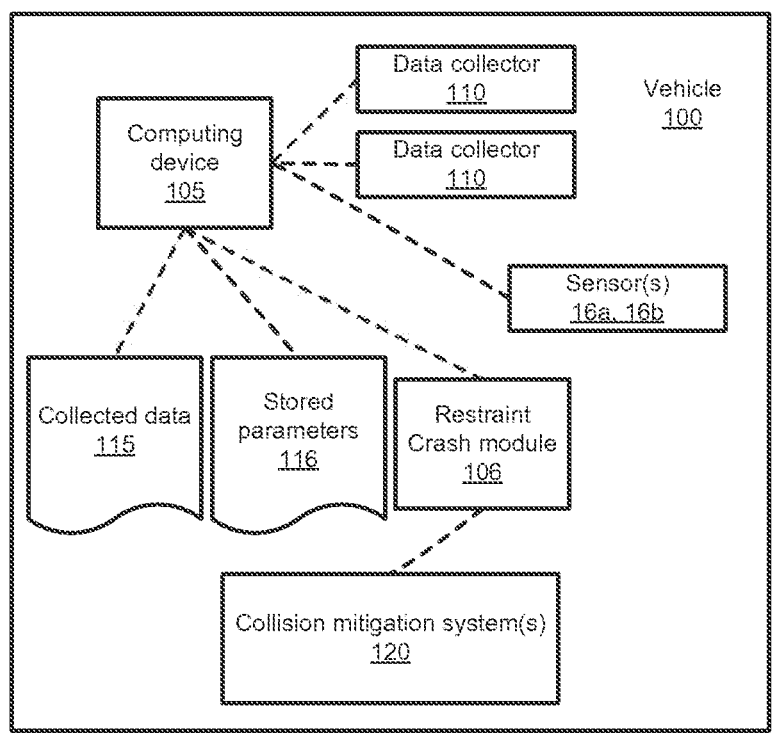
FIG. 12 is a block diagram of an exemplary vehicle system.

With further reference to FIG. 12, the vehicle 100 includes vehicle computing device or computer 105 in communication with a sensing element of a sensing fastener according to the present disclosure, such as sensor 16a of the fastener 10A, that generally includes a processor and a memory, the memory including one or more forms of computer-readable media, and storing instructions executable by the processor for performing various operations, including as disclosed herein. The computer 105 of the vehicle 100 receives information, e.g., collected data, from one or more data collectors 110 related to various components or conditions of the vehicle 100, e.g., components such as a braking system, a steering system, a powertrain, etc., and/or conditions such as vehicle 100 speed, acceleration, pitch, yaw, roll, etc. The computer 105 generally includes restraint crash module 106 that comprises instructions for operating collision mitigation systems or equipment 120. Further, the computer 105 may include more than one computing device, e.g., controllers or the like included in the vehicle 100 for monitoring and/or controlling various vehicle components, e.g., a restraint crash module 106, an engine control unit (ECU), transmission control unit (TCU), etc. The computer is generally configured for communications on a controller area network (CAN) bus or the like. The computer may also have a connection to an onboard diagnostics connector (OBD-II). Via the CAN bus, OBD-II, and/or other wired or wireless mechanisms, the computer may transmit messages to various devices in a vehicle and/or receive messages from the various devices, e.g., controllers, actuators, sensors, etc., including the sensing element 16a of a sensing fastener and collision mitigation systems or equipment 120. Alternatively or additionally, in cases where the computer actually comprises multiple devices, the CAN bus or the like may be used for communications between the multiple devices that comprise the vehicle computer. In addition, the computer may be configured for communicating with a network, which may include various wired and/or wireless networking technologies, e.g., cellular, Bluetooth, wired and/or wireless packet networks, etc.

Generally included in instructions stored in and executed by the computer 105 is a restraint crash module 106. Using data received in the computer 105, e.g., from data collectors 110, including the sensing element 16a of a sensing fastener, data included as stored parameters 116, etc., the module 106 may control various vehicle 100 collision mitigation systems or equipment 120. For example, the module 106 may be used to deploy bumper- or hood-mounted airbags and hood-lifting systems if an impact with a pedestrian is detected. Further, the module 106 may include instructions for evaluating information received in the computer 105 relating to vehicle 100 operator characteristics, e.g., from the sensing element 16a of a sensing fastener and/or other data collectors 110.

Data collectors 110 may include a variety of devices. For example, various controllers in a vehicle may operate as data collectors 110 to provide data 115 via the CAN bus, e.g., data 115 relating to vehicle speed, acceleration, etc. Further, sensors or the like, global positioning system (GPS) equipment, etc., could be included in a vehicle and configured as data collectors 110 to provide data directly to the computer 105, e.g., via a wired or wireless connection. Sensor data collectors 110 could include communication devices to send and receive information from other vehicles, such as path intentions from vehicles surrounding vehicle 100. Sensor data collectors 110 could include mechanisms such as RADAR, LADAR, sonar, etc. sensors that could be deployed to measure a distance between the vehicle 100 and other vehicles or objects. Yet other sensor data collectors 110 could include impact sensors such as the sensing element 16a of a sensing fastener. In addition, data collectors 110 may include sensors to detect a position, change in position, rate of change in position, etc., of vehicle 100 components such as a steering wheel, brake pedal, accelerator, gearshift lever, etc.

A memory of the computer 105 generally stores collected data 115. Collected data 115 may include a variety of data collected in a vehicle 100. Examples of collected data 115 are provided above, and moreover, data 115 is generally collected using one or more data collectors 110, and may additionally include data calculated therefrom in the computer 105, and/or at the server 125. In general, collected data 115 may include any data that may be gathered by a collection device 110 and/or computed from such data. Accordingly, collected data 115 could include a variety of data related to vehicle 100 operations and/or performance, data received from another vehicle, as well as data related to environmental conditions, road conditions, etc. relating to the vehicle 100. For example, collected data 115 could include data concerning a vehicle 100 speed, acceleration, pitch, yaw, roll, braking, presence or absence of precipitation, tire pressure, tire condition, etc.

A memory of the computer 105 may further store parameters 116. A parameter 116 generally governs control of a system or component of vehicle 100. These parameters may vary due to an environmental condition, road condition, vehicle 100 condition, or the like. For example, a parameter 116 may specify predetermined impact thresholds for identifying pedestrians and, thus, conditions for deployment of pedestrian impact mitigation systems such as bumper- or hood-mounted airbags and hood-lifting systems.

In addition to FIG. 1, FIGS. 2-5 are exemplary cross-sectional illustrations of exemplary sensing fasteners according to the present disclosure, including both common and varying features and configurations. With particular reference to FIG. 1, the exemplary fastener 10A includes the head portion 12a, the body 14a, and the sensor 16a. The head 12a includes an inner surface 50 opposite an outer surface 52. The head portion 12a further includes a peripheral surface 54 extending between the inner and outer surfaces 50, 52. The exemplary head portion 12a also has a recess 56 defined therein, which extends between the inner and outer surfaces 50, 52. As such, the head portion 12a, in particular the peripheral surface 54, extends around the recess 56.

The recess 56 of the head portion 12a is complementary to the sensor 16a, so as to receive sensor 16a therein. The sensor 16a includes an inner surface 60 opposite an outer surface 62, as well as a peripheral surface 64a extending therebetween. The chamber 20 of the sensor 16a is formed in the inner surface 60, and the port 40 is formed in the outer surface 62. The sensor 16a is sized complementary to the head portion 12a, and the recess 56 thereof, so that the inner and outer surfaces 60, 62 of the sensor 16a may respectively align substantially along or parallel to the inner and outer surfaces 50, 52 of the head portion 12a of the fastener 10, when sensor 16a is disposed within the recess 56 of the head portion 12a. The recess 56 of the head portion 12a and the peripheral surface 64 of the sensor 16a are shaped complementary to each other. The sensor 16a is fixed to the head portion 12a such as with adhesive or another chemical attachment. It should be understood that the head portion 12a and the sensor 16a may be fixed together in a variety of ways in addition to adhesive or another chemical attachment, such as, for example, overmolding, welding, or mechanical attachment with screws and/or pins.

The exemplary fastener 10A further includes the body 14a fixed relative to the head portion 12a and the sensor 16a. The body 14a includes an end 70 arranged to face the inner surfaces 50, 60 of the head portion 12a and sensor 16a, respectively. The end 70 of the body 14a overlaps and engages or interfaces with the inner surface 60 of the sensor 16a. The body 14a further includes a tip portion 72, a main portion 74 and an outer surface 76 extending over the peripheries of the tip portion 72 and the main portion 74. The main channel 30a extends from the outer surface 76 at the tip portion 72, through the tip and main portions 72, 74 and to the end 70 of the body 14a. Accordingly, the volume outside of the outer surface 76 of the body 14a is in fluid communication with the chamber 20 formed within the sensor 16.

The body 14a may be fixed to the head portion 12a and the sensor 16a as disclosed herein with regard to the engagement of the head portion 12a and the sensor 16a. It should also be understood that, in some configurations, the body 14a may be integrally formed with the head portion 12a.

The exemplary fastener 10A illustrated in FIG. 1 is in the exemplary configuration of a bolt. The fastener 10A includes a fastening portion in the form of a thread 78 extending radially outwardly from the outer surface 76 of the main portion 72. It should be understood that a sensing fastener according to the present disclosure can have the configuration of a variety of fastening components or apparatuses including a fastening portion, surface or mechanism thereon, such as, for example, bolts, screws, nails, pins, rivets, nuts, washers, and snapping components.

Referring to FIG. 2, an exemplary sensing fastener 10B is illustrated. The fastener 10B includes the head portion 12a, the body 14a and the sensor 16a. The fastener 10B further includes supplemental channels 30b and 30c extending through the tip portion 72 of the body 14a. The supplemental channels 30b and 30c intersect with and are in fluid communication with the main channel 30a. It should be understood that the description of the elements herein, including, e.g., their associated sub-components, surfaces and features, applies to each of the exemplary sensing fasteners including the elements with the same or similar reference numbers. For example, the description of the head portion 12a and sensor 16a with respect to the fastener 10A equally applies to the fastener 10B.

Referring to FIG. 3, another exemplary sensing fastener 10C is illustrated. The fastener 10C includes the head portion 12a, the body 14a and the sensor 16a. In place of the main channel 30a, the fastener 10C includes angled channels 30d and 30e. The angled channels 30d, 30e extend through the thread 78. Each of angled channels 30d and 30e extend from a portion of the outer surface 76 of the main portion 74 of the body 14a to the end 70 of the body 14a. The angled channels 30d, 30e are in fluid communication with the chamber 20 of the sensor 16a. Accordingly, the volume outside of the outer surface 76 of the body 14a is in fluid communication with the chamber 20 formed within the sensor 16a.

Referring to FIG. 4, another exemplary sensing fastener 10D is illustrated. The fastener 10D includes the head portion 12a, the body 14a, the sensor 16a, the main channel 30a, and the thread 78. The fastener 10D further includes a lateral channel 30f extending across the main portion 74 at opposing positions of the body 14a. The lateral channel 30f intersects the main channel 30a. The fastener 10D includes leak sensors 80 disposed within the lateral channel 30f, proximate the opposing ends of the lateral channel 30f at the opposing positions at the outer surface 76 of the body 14*a*. The leak sensors 80 are operably coupled to the sensor 16*a*. The leak sensors 80 may have a variety of configurations, such as, by way of non-limiting example, wire sensors or membranes for measuring the velocity of fluid passing through the channel 30*f*.

Figure 6:
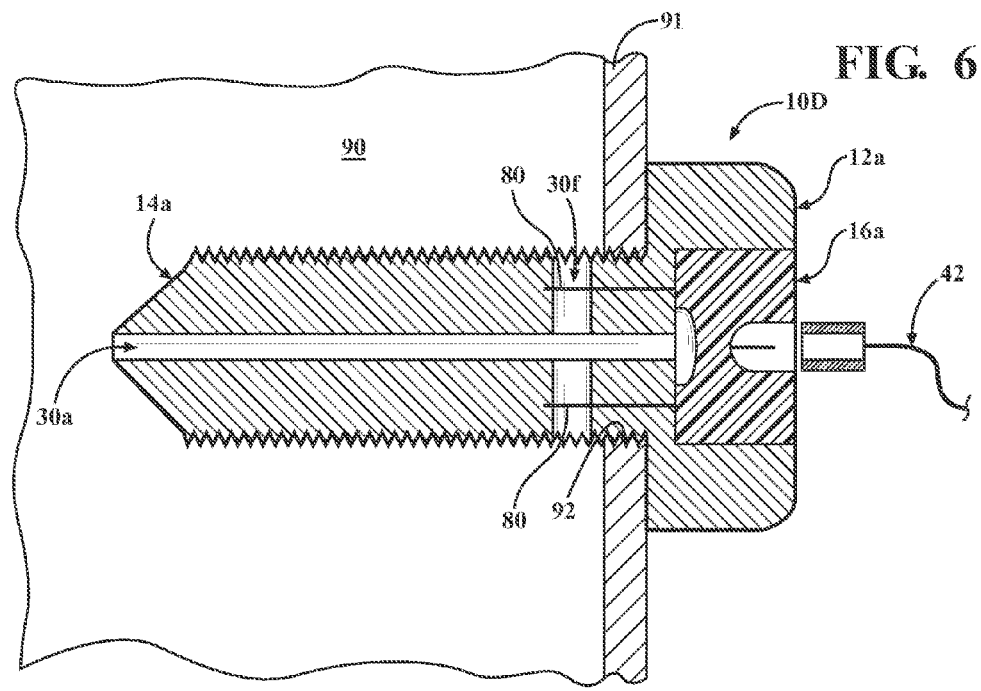
FIG. 6 is a cross-sectional view of the exemplary sensing fastener of FIG. 4 engaged with a first component.
Figure 7:
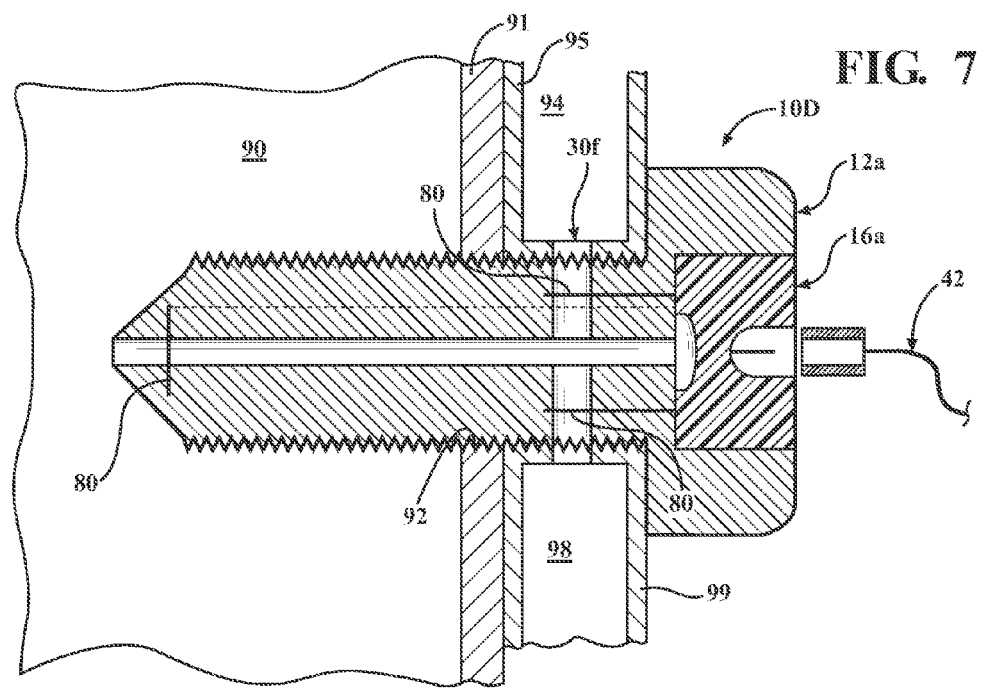
FIG. 7 is a cross-sectional view of the exemplary sensing fastener of FIG. 4 engaged with a plurality of components.

With additional reference to FIGS. 6 and 7, exemplary implementations of fastener 10D are illustrated. As illustrated in FIG. 6, the body 14*a* of the fastener 10D extends into a first controlled volume 90, such as a pressurized component in a door or bumper assembly of the vehicle 100. The first controlled volume 90 is bounded (not shown) by a first surface 91, and the body 14*a* of the fastener 10D extends through an aperture 92 of the first surface 91. The first controlled volume is in fluid communication with the chamber 20 of the sensor 16*a* through the main channel 30*a*, and the lateral channel 30*f*. Accordingly, the sensor 16*a* generates a signal corresponding to the pressure of the first controlled volume 90, and communicates with the computer 105 of the vehicle 100. Upon impact of vehicle 100 at a position mechanically coupled to the first controlled volume 90, e.g., a frontal impact for a configuration with the first controlled volume 90 in the front bumper assembly of the vehicle 100, the sensor 16*a* senses and communicates any change in pressure to the computer 105 of the vehicle 100 for operation of vehicle 100, e.g., operation of collision mitigation equipment under specified impact conditions. In the event that the first controlled volume 90 is leaking, the leak sensors 80 sense and communicate movement of the fluid (e.g. air) in the first controlled volume 90 to the computer 105 of the vehicle 100, to enable, e.g., a service or error message to be generated for the vehicle user.

As illustrated in FIG. 7, the fastener 10D may include another leak sensor 80 with the main channel 30*a* and join and provide sensing with multiple components, e.g. multiple pressurized components of a door or bumper assembly for the vehicle 100. The fastener 10D is adjacent to and overlaps a second controlled volume 94, bounded by the second surface 95, and a third controlled volume 98, bounded by the third surface 99. The fastener 10D couples the first, second and third surfaces 91, 95 and 99 together. The first, second and third controlled volumes 90, 94, 98 are in fluid communication with each other and the chamber 20 of the sensor 16*a*. Upon impact of vehicle 100 at a position mechanically coupled to this assembly, e.g., a frontal impact for a configuration with this assembly in the front bumper assembly of the vehicle 100, the sensor 16*a* senses and communicates any change in pressure to the computer 105 of the vehicle 100 for operation of vehicle 100, e.g., operation of collision mitigation equipment under specified impact conditions. In the event that any of the components is leaking, the leak sensors 80 sense and communicate movement of the fluid (e.g. air) in the controlled volumes to the computer 105 of the vehicle 100, to enable, e.g., a service or error message to be generated for the vehicle user.

Figure 5:
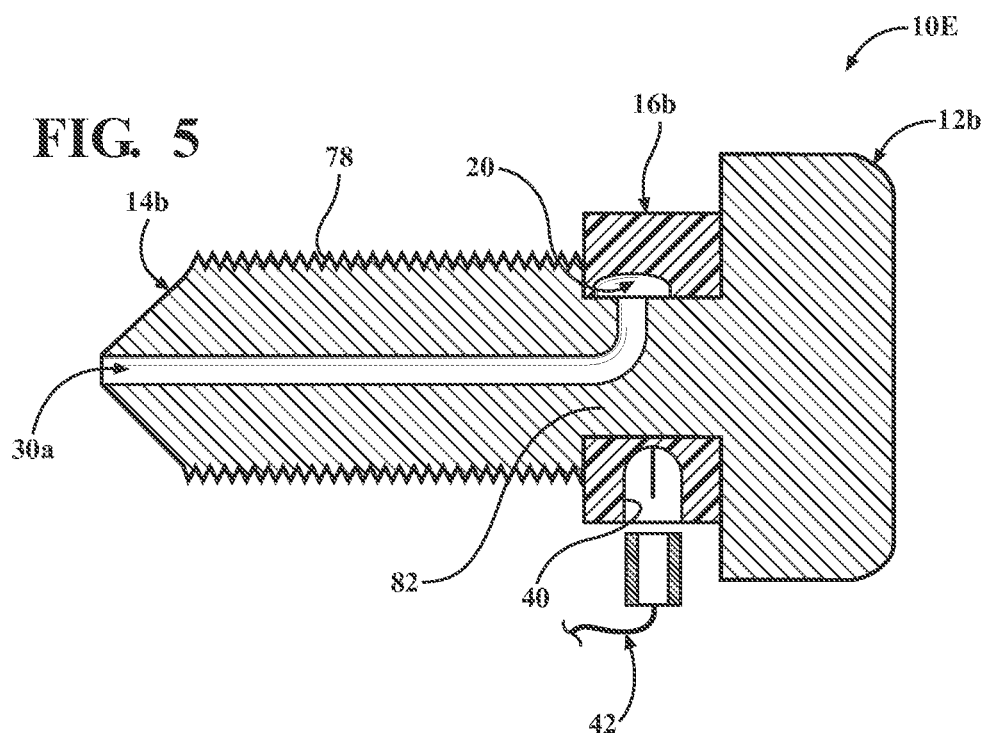
FIG. 5 is a cross-sectional view of another exemplary sensing fastener.

Referring to FIG. 5, another exemplary sensing fastener 10E is illustrated. The fastener 10E includes a body 14*b*, a channel 30*g*, and the thread 78. The body 14*b* includes a radial recess 82, which receives a sensor 16*b*. The fastener 10E includes a head portion 12*b* coupled to the body 14*b*. The sensor 16*b* includes the port 40 on the side thereof. The channel 30*g* curves and extends in the radial direction to the chamber 20 of the sensor 16*b*.

Figure 8:
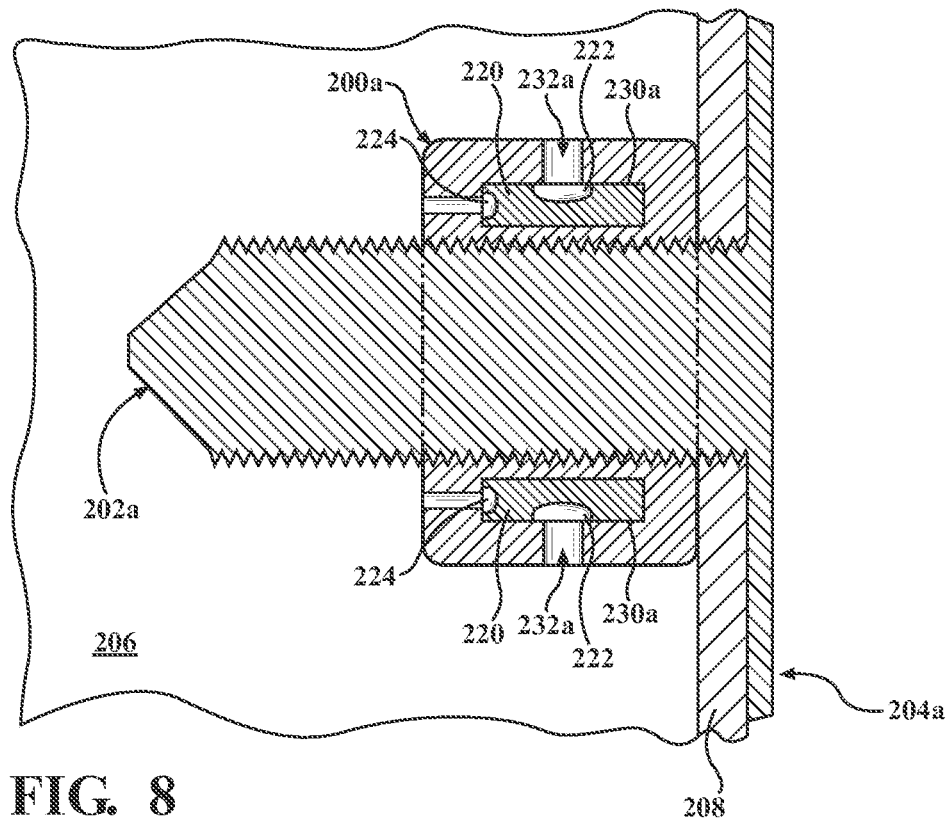
FIG. 8 is a cross-sectional view of another exemplary sensing fastener engaged with multiple components.
Figure 9:
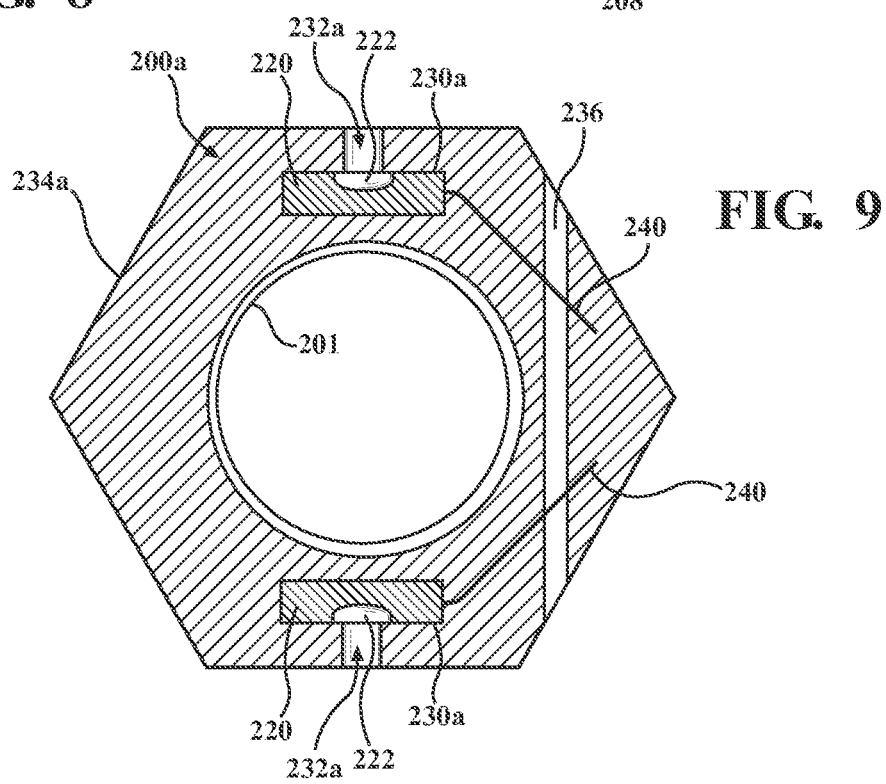
FIG. 9 is a cross-sectional view of the sensing fastener of FIG. 8.

Referring to FIGS. 8-9, another exemplary sensing fastener is illustrated. In this example, the sensing fastener is in the form of a threaded nut 200*a*. The nut 200*a* includes a threaded fastening portion 201 that cooperates with a threaded stud 202*a* of a base vehicle component 204*a*. The stud 202*a* extends into a volume 206 of a supported component 208. The nut 200*a* engages the stud 202*a* and clamps the supported component 208 to the base component 204*a* within the volume 206.

The nut 200*a* includes sensing elements or sensors 220. While the nut 200*a* is illustrated with two sensors 220 in the exemplary illustrations of FIGS. 8-9, it should be understood that, according to the principles of the present disclosure, a sensing fastener in the form of a nut may include only one sensor 220. The sensors 220 may include a piezoelectric material and may be configured to communicate with a vehicle control system, e.g. the computer 105 of the vehicle 100, as described herein with respect to sensor 16*a*. The sensors 220 each include a chamber 222 formed therein and a port 224 for connecting to a vehicle control system. The sensors 220 are each received in a recess 230*a* of the nut 200*a*. The nut 200*a* includes channels 232*a* extending from the recesses 230*a* to an outside surface 234*a* thereof. The channels 232*a* are in fluid communication with the chambers 222 of the sensors 220, respectively. The nut 200*a* may also include one or more auxiliary channels 236 passing between two portions of the outer surface 234*a*, having leak sensors 240 disposed therein and in communication with the sensors 220, respectively, such as the leak sensors 80 described herein with respect to exemplary sensing fastener 10D.

As illustrated in FIG. 8, the nut 220*a* is disposed entirely within the volume 206 of the supported component 208, such as a pressurized component in a door or bumper assembly of the vehicle 100. As such, the volume 206 is in fluid communication with the chamber 222 of each sensor 220 through the respective channel 232*a*. Accordingly, the sensors 220 generate signals corresponding to the pressure of the volume 206, and communicates with the computer 105 of the vehicle 100. Upon impact of vehicle 100 at a position mechanically coupled to the volume 206, e.g., a frontal impact for a configuration with the volume 206 in the front bumper assembly of the vehicle 100, the sensors 220 sense and communicate any change in pressure to the computer 105 of the vehicle 100 for operation of vehicle 100, e.g., operation of collision mitigation equipment under specified impact conditions. For implementations in which the nut 200*a* includes one or more leak sensors 240, in the event that the component 208 is leaking, each leak sensor 240 may sense and communicate movement of the fluid (e.g., air) in the volume 206 to the computer 105 of the vehicle 100, to enable, e.g., a service or error message to be generated for the vehicle user.

Figure 10:
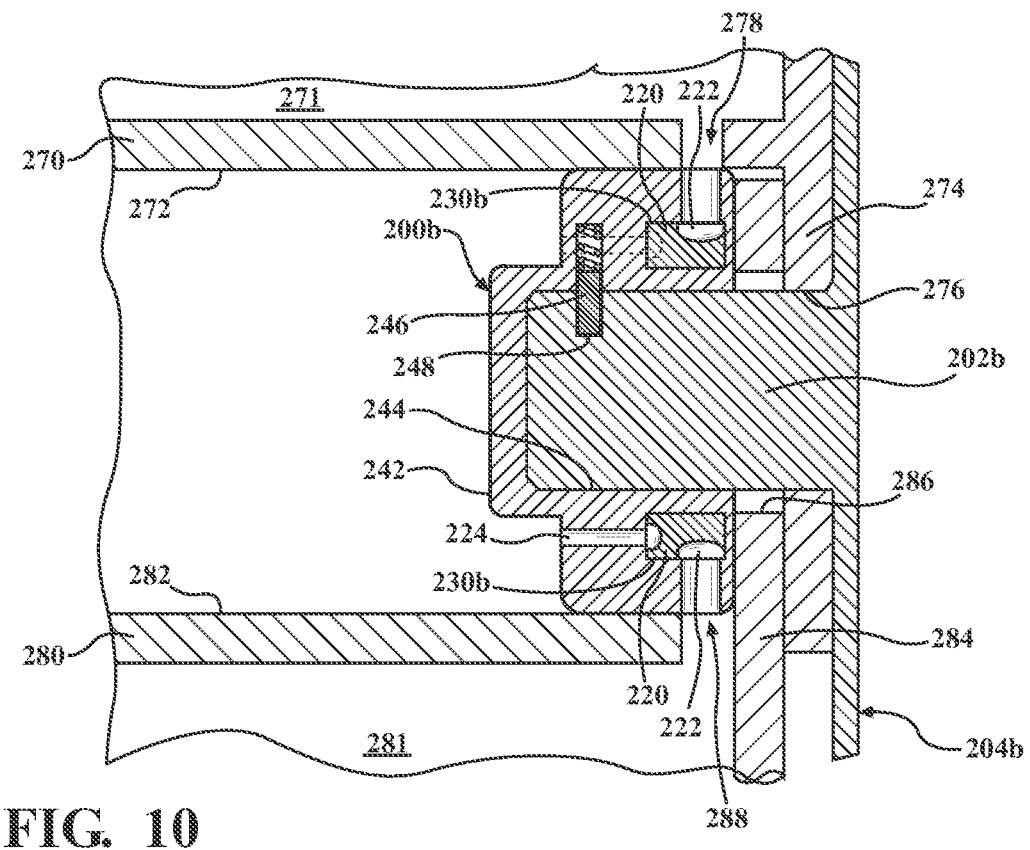
FIG. 10 is a cross-sectional view of another exemplary sensing fastener engaged with multiple components.
Figure 11:
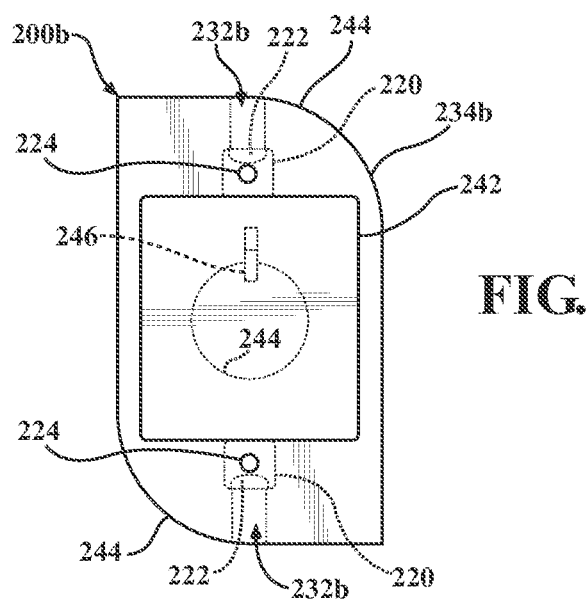
FIG. 11 is a top view of the sensing fastener of FIG. 10.

Referring to FIGS. 10-11, another exemplary sensing fastener is illustrated. In this example, the sensing fastener is in the form of a snap nut 200*b*. A snap nut has one or more discrete engagement points on a stud component, such as engagement of a spring-loaded pin on one of the components and a complementary recess on the other component. The snap nut 200*b* cooperates with a stud 202*b* of a base vehicle component 204*b*.

The snap nut 200*b* includes sensing elements or sensors 220 as described herein with respect to the threaded nut 200*a*. While the snap nut 200*b* is illustrated with two sensors 220 in the exemplary illustrates of FIGS. 10-11, it should be understood that, according to the principles of the present disclosure, a sensing fastener in the form of a nut may include only one sensor 220. The sensors 220 are each received in a recess 230*b* of the snap nut 200*b*. The snap nut 200*a* includes channels 232*b* extending from the recesses 230*b* to an outside surface 234*b* thereof and in fluid communication with the chambers 222 of the sensors 220, respectively. The nut 200b may also include one or more auxiliary channels with a leak sensor disposed therein and in communication with the sensors 220, respectively, such as the auxiliary channel 236 and the leak sensors 240 described herein with respect to exemplary sensing fastener 200a.

The snap nut 200b may include a rectangular cap 242 to facilitate manipulation thereof relative to the stud 202b. The snap nut 200b includes a fastening portion or mechanism in the form of a recess 244 complementary to the end of stud 202b, and a pin 246 in the recess 244. The stud 202b includes an aperture 248 complementary to the pin 246. To couple the snap nut 200b to the stud 202b, the recess 244 extends over the end of the stud 202b, and the pin 246 is compressed. The snap nut 200b is rotated until the pin 246 is aligned with the aperture 248 and springs into engagement therewith to mechanically lock the snap nut 200b to the stud 202b. It should be understood that that the interlocking of the snap nut 200b and the stud 202b with pin 246 and aperture 248 is exemplary.

The outer surface 234b includes rounded portions 244 to facilitate a sealed engagement between the snap nut 200b and secured components, if desired. For example, the stud 202b may secure multiple components relative to the base component 204b and provide sensing of the volumes of those components, as illustrated in FIG. 10. A first supported component 270 encloses a volume 271. The first supported component 270 includes an outside surface 272 and a flange 274. The flange 274 includes an aperture 276 which the stud 202b extends through, and the outside surface includes a channel 278 proximate the flange 274. A second supported component 280 encloses a volume 281. The second supported component 280 includes an outside surface 282 and a flange 284. The flange 284 includes an aperture 286 which the stud 202b extends through, and the outside surface includes a channel 288 proximate the flange 284. The flanges 274, 284 of the first and second supported components 270, 280 overlap with one another, and the channels 278, 288 of the first and second supported components 270, 280 are substantially aligned with one another. The snap nut 200b engages the stud 202b and clamps the first and second supported components 270, 280 relative to the base component 204b. The outside surface 234b of the snap nut 200b sealingly engages the outside surfaces 272, 282 of the first and second supported components 270, 280, respectively. The channels 232b of the snap nut 200b align with the channels 278, 288 of the first and second supported components 270, 280, respectively. Accordingly, the sensors 220 are in fluid communication with the volumes 271, 281, respectively, and can detect and communicate to the computer 105 of the vehicle 100 the pressure of each of those volumes and leakage from each of those volumes as described herein with respect to the other exemplary sensing fasteners. It should be understood that each of the forms, e.g., bolt, screw, nut, etc., of sensing fasteners according to the present disclosure may be configured for the exemplary implementations of the disclosure. For example, a threaded nut may be configured to couple and provide sensing for multiple components, as disclosed with respect to the exemplary snap nut, and a snap nut may be configured to secure and provide sensing within a single component, as described with respect to the exemplary threaded nut.

In the drawings, the same reference numbers indicate the same elements. Further, some or all of these elements could be changed. Accordingly, it is to be understood that the above description is intended to be illustrative and not restrictive. Many embodiments and applications other than the examples provided would be apparent to those of skill in the art upon reading the above description. The scope of the invention should be determined, not with reference to the above description, but should instead be determined with reference to the appended claims, along with the full scope of equivalents to which such claims are entitled. It should be understood that, as used herein, exemplary refers to serving as an illustration or specimen, illustrative, or typical. It is anticipated and intended that future developments will occur in the arts discussed herein, and that the disclosed systems and methods will be incorporated into such future embodiments. In sum, it should be understood that the invention is capable of modification and variation and is limited only by the following claims.

All terms used in the claims are intended to be given their broadest reasonable constructions and their ordinary meanings as understood by those skilled in the art unless an explicit indication to the contrary in made herein. In particular, use of the singular articles such as "a," "the," "said," etc. should be read to recite one or more of the indicated elements unless a claim recites an explicit limitation to the contrary.

The invention claimed is:

1. An apparatus comprising:
a body having a fastening portion; and
a pressure sensor coupled to the body apart from the fastening portion and having a chamber therein;
wherein the body includes a first channel extending therethrough from an opening in an outside surface thereof, the first channel in direct fluid communication with the chamber and the pressure sensor.

2. The apparatus of claim 1, wherein the body includes a second channel intersecting the first channel and the outside surface of the body.

3. The apparatus of claim 2, wherein the second channel extends between two positions on the outside surface of the body.

4. The apparatus of claim 2, further comprising a velocity sensor disposed within one of the first and second channels of the body.

5. An apparatus comprising:
a body having a fastening portion; and
a pressure sensor coupled to the body apart from the fastening portion and having a chamber therein;
wherein the body includes a first channel extending therethrough from an outside surface thereof, the first channel in fluid communication with the chamber, and
wherein the body includes a head portion and an elongate portion, the head portion having an inside surface coupled to and overlapping a first end of the elongate portion, the first channel extending from an outside surface of the elongate portion.

6. The apparatus of claim 5, wherein the first channel extends between the first end of the elongate portion and a second end of the elongate portion opposite the first end.

7. The apparatus of claim 5, wherein the pressure sensor is received within the head portion.

8. The apparatus of claim 5, wherein the fastening portion is disposed on the elongate portion.

9. The apparatus of claim 1, wherein the body includes an interior surface defining an aperture, the fastening portion extends from the interior surface within the aperture, and the pressure sensor is disposed between the interior surface and a section of the outside surface of the body extending about the interior surface.

10. The apparatus of claim 9, wherein the aperture is a through hole and the fastening portion is a thread formed on the surface of the body of the through hole.

11. The apparatus of claim 9, wherein the aperture is a recess in the body and the fastening portion is a resilient pin extending into the recess.

12. An assembly comprising:
a first component enclosing a first volume; and
a sensing fastener coupled to the first component, the sensing fastener including a body having a fastening portion and a first pressure sensor coupled to the body apart from the fastening portion, the first pressure sensor having a chamber therein, the body including a first channel extending therethrough from a first opening in an outside surface thereof, the first channel in direct fluid communication with the chamber of the first pressure sensor, the body further including a second channel extending therethrough from a second opening in the outside surface thereof, the sensing fastener further including a velocity sensor disposed within one of the first and second channels of the body,
wherein the outside surface of the body of the sensing fastener is positioned to fluidly couple the first volume and the chamber of the first pressure sensor through the first channel.

13. The assembly of claim 12, further comprising a second component enclosing a second volume, wherein the sensing fastener is coupled to the second component.

14. The assembly of claim 13, wherein the second channel of the body of the sensing fastener intersects the first channel, and the second volume is in fluid communication with the chamber of the first pressure sensor through the second channel.

15. The assembly of claim 13, wherein the sensing fastener includes a second pressure sensor coupled to the body, the second pressure sensor having a chamber therein, and the second volume is in fluid communication with the chamber of the second pressure sensor through the second channel.

16. The assembly of claim 12, wherein the body of the sensing fastener includes a head portion and an elongate portion, the first pressure sensor is coupled to the head portion, and the first channel of the body of the sensing fastener extends from an outside surface of the elongate portion of the body.

17. The assembly of claim 16, wherein the elongate portion of the body of the sensing fastener extends into the first volume, and the head portion of the body of the sensing fastener engages the first component outside the first volume.

18. The assembly of claim 12, wherein the body of the sensing fastener includes an interior surface defining an aperture, the fastening portion extends from the interior surface within the aperture, and the first pressure sensor is disposed between the interior surface and a second of the outside surface of the body extending about the interior surface.

19. The assembly of claim 18, wherein the sensing fastener engages the first component within the first volume.

20. The apparatus of claim 5, wherein the body includes a second channel intersecting the first channel and the outside surface of the body, the apparatus further comprising a velocity sensor disposed within one of the first and second channels of the body.

* * * * *